United States Patent
Tang-Petersen

(10) Patent No.: US 6,903,740 B1
(45) Date of Patent: Jun. 7, 2005

(54) VOLUMETRIC-BASED METHOD AND SYSTEM FOR VISUALIZING DATASETS

(75) Inventor: Svend Tang-Petersen, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 10/174,239

(22) Filed: Jun. 17, 2002

Related U.S. Application Data

(60) Provisional application No. 60/298,416, filed on Jun. 18, 2001.

(51) Int. Cl.[7] .............................................. G06T 17/00
(52) U.S. Cl. ....................................................... 345/424
(58) Field of Search ................................. 345/419, 424

(56) References Cited

PUBLICATIONS

Baudemont et al., "Structural Analysis of DEMs by Intersection of Surface Normals in a Thre–Dimensional Accumulator Space," 2000, IEEE, pp. 1191–1198.*

\* cited by examiner

Primary Examiner—Mark Zimmerman
Assistant Examiner—Lance W. Sealey
(74) Attorney, Agent, or Firm—Woodcock Washburn LLP

(57) ABSTRACT

The present invention is a method for visualizing a plurality of stochastic datasets. The present invention provides a more accurate account of situations in the real world to better enable scientists and engineers to utilize the results of computer models. The method employs a two-stage process comprising a preprocessing stage and a visualization stage. Activity begins with the preprocessing stage. In this stage, the individual output from a plurality of different computations are converted from being described as two-dimensional surfaces in three-dimensional space to a three-dimensional voxel-based representation. For each surface set in the plurality of two-dimensional representations, a count is obtained of the total number of surfaces in the surface set which intersects the subspace of a voxel (each element of the data structure represents the subspace of a voxel in the three-dimensional voxel-based representation). The count is obtained for each element of the data structure, and the sequence is repeated for each surface set. Finally, in a visualization stage, after the volume is saved as an image file, transparency and color values are determined based on one or more look-up tables. Finally, the volume is rendered and drawn with user-controllable transparency and color.

16 Claims, 6 Drawing Sheets

US 6,903,740 B1

VOLUMETRIC-BASED METHOD AND SYSTEM FOR VISUALIZING DATASETS

"This application claims benefit of Provisional Application No. 60/298,416, filed Jun. 18, 2001, the entirety of which is incorporated herein by reference."

BACKGROUND OF THE INVENTION

1. Field of the Invention

The present invention relates generally to computer-generated data visualization.

2. Related Art

Data simulations are now carried out on computers in a variety of applications. For example, data simulations are used in mathematical models of behavior, events, phenomena, or activity or other type of mathematical analysis. Many data simulations involve a number of computations with one or more parameters. In the face of time or processing resource constraints, many data simulations are run using nominal or average values as parameter values in the data simulation. This reduces the accuracy of the data simulation.

For example, in the scientific arts, to simulate various problems encountered, data simulations are generated to analyze the physics involved in a particular problem. For instance, to better enable automobile manufacturers to produce automobiles that will withstand collisions, scientists and engineers run many data simulations in an attempt to discover how to better improve their products. However, due to the many calculations and computations involved in the data simulations, the process is not as accurate as it could be.

For instance, many parameters are used in automobile testing data simulations, such as sheet metal thickness, sheet metal porosity, automobile speed, and angle of impact of a collision. Scientists and engineers often run the data simulations with an average value for some of these parameters to simplify calculations in the data simulations. For instance, standard thickness and porosity values provided by a sheet metal manufacturer may be used in a data simulation even though in practice the actual characteristics of the sheet metal will slightly vary across an actual piece of sheet metal in automobile under test. The scientists and engineers run the data simulations based on the automobile having the standard parameter values due to time constraints of the computer computations. These data simulations, however, do not take into account the various cases in which the parameter values of the automobile vary. For example, it is a known fact in the automobile industry that the thickness, strength, and porosity of sheet metal used to manufacture automobiles vary by as much as thirty percent.

Thus, scientists do not obtain a very accurate overall picture of real life situations. For instance, assume that scientists in the automobile industry are studying the crumbling pattern for sheet metal used to manufacture automobiles. If the thickness of a piece of sheet metal has a Gaussian distribution and the crumbling pattern is symmetric, then the most likely crumbling pattern is not the pattern described by the average thickness of the sheet metal but a thickness offset by a particular lesser or greater amount than that of the value representing the average thickness.

In other type of example, data simulations may be run for a mathematic model which does not have a finite solution for certain parameter values. For instance, most physical processes are described by sets of equations to which there are no analytical solutions. In other words, there is no set of new equations that will exactly describe the result for any given input condition(s). To obtain a solution, scientists and engineers revert to computer models based on an original equation set, and calculate a result for the given conditions numerically. This method involves reformulating the equations to be solved on points on a mesh.

For instance, in weather forecasting, various variables such as wind speed, direction, temperature and pressure are calculated in points on a three-dimensional mesh covering the geographical area of interest and extending into the upper atmosphere. The coarser the three-dimensional mesh, the less accurate the result will be and the ability to predict future weather patterns will be reduced. Given limits in computational power and computer memory, it would not be feasible to use infinitely high resolution. For example, if the grid resolution was improved by a factor of two, a typical computation would require eight times the memory used in a system not engaging in high resolution. Similarly, a typical computation would require sixteen times the computational resources used in a system not engaging in high resolution. Thus, a trade off has to be achieved between accuracy and practical restrictions.

Since some of the physical processes which contribute to the overall behavior of the model occur on scales smaller than the model can resolve, scientists usually account for this by adding this imbalance to the equation set in the form of parametric equations. These parameters are usually tuned in such a fashion that the computational model predicts known cases within a certain tolerance. Nevertheless, there is still a range of uncertainty.

One solution to this problem is to run the calculations repeatedly while varying the parameters, thus obtaining more data simulations and improving accuracy. For example, in the above case of an automobile crash test, this requires a very large number of scenarios for the same automobile impacting the same obstacle, while varying a selected group of parameter values. Each data simulation produces an output dataset. Increasing the number of data simulations, then increases the number of output datasets.

The problem is that scientists and engineers must visualize the data in order to realize where they need to direct their efforts for improvement and further analysis. Due to the very large number of scenarios and data sets involved, it is impractical to view the simulation for every single data set. Further, the more datasets that are generated, the greater the difficulty in obtaining an overview of what is actually occurring.

What is needed is a method and system that provides a visual representation of multiple datasets.

SUMMARY OF THE INVENTION

The present invention provides a method and system for visualizing multiple datasets. In one embodiment, a method and system for visualizing a plurality of stochastic datasets is provided. A two-stage process includes a preprocessing stage and a visualization stage. In the preprocessing stage, the individual output datasets from a plurality of different computations are converted from being described as two-dimensional surfaces in three dimensional space to a three dimensional voxelbased representation. A three-dimensional data structure (for example, an array) is generated to represent the voxed-based form. For each surface set in the plurality of two-dimensional representations, a count is obtained of the total number of surfaces in the surface set which intersects the subspace of a voxel (each element of the data structure represents the subspace of a voxel in the three-dimensional voxel-based representation). The count is obtained for each element of the data structure. Next, the data structure is scaled by the number of datasets to form a probability density. If the particular problem to be solved is dynamic or involves a time sequence, the counting process is repeated for each time period in the time sequence to generate a series of three-dimensional voxel-based data structures spanning the time sequence. Finally, the data structure is saved as an image file.

In the visualization stage, the image file is loaded into texture memory and rendered using a specific volume rendering Application Program Interface (API) to interactively map each scalar value in the original greyscale image file to an actual color and transparency value. In this way, a three-dimensional image is displayed which is representative of the characteristics of multiple datasets. A user can adjust color and transparency inputs through a graphical user-interface to further control the visualization of the datasets.

In this way, the present invention presents a more accurate account of situations in the real world to better enable scientists and engineers to utilize the results of computer models. A three-dimensional image can be displayed which is representative of the characteristics of multiple datasets even when many different data simulations involving different parameter values are run.

Further features and advantages of the present invention, as well as the structure and operation of various embodiments of the present invention, are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally,the left-most digit of a reference number identifies the drawing in which the reference number first appears.

DETAILED DESCRIPTION OF THE PREFERRED EMBODIMENTS

The present invention relates to a method and system for visualizing multiple datasets including, but not limited to, multiple stochastic datasets. The present invention is described in terms of these example environments. Description in these terms is provided for convenience only. It is not intended that the invention be limited to application in these example environments. In fact, after reading the following description, it will become apparent to a person skilled in the relevant art how to implement the invention in alternative environments known now or developed in the future.

Preprocessing Stage—Stage One

Figure 1:
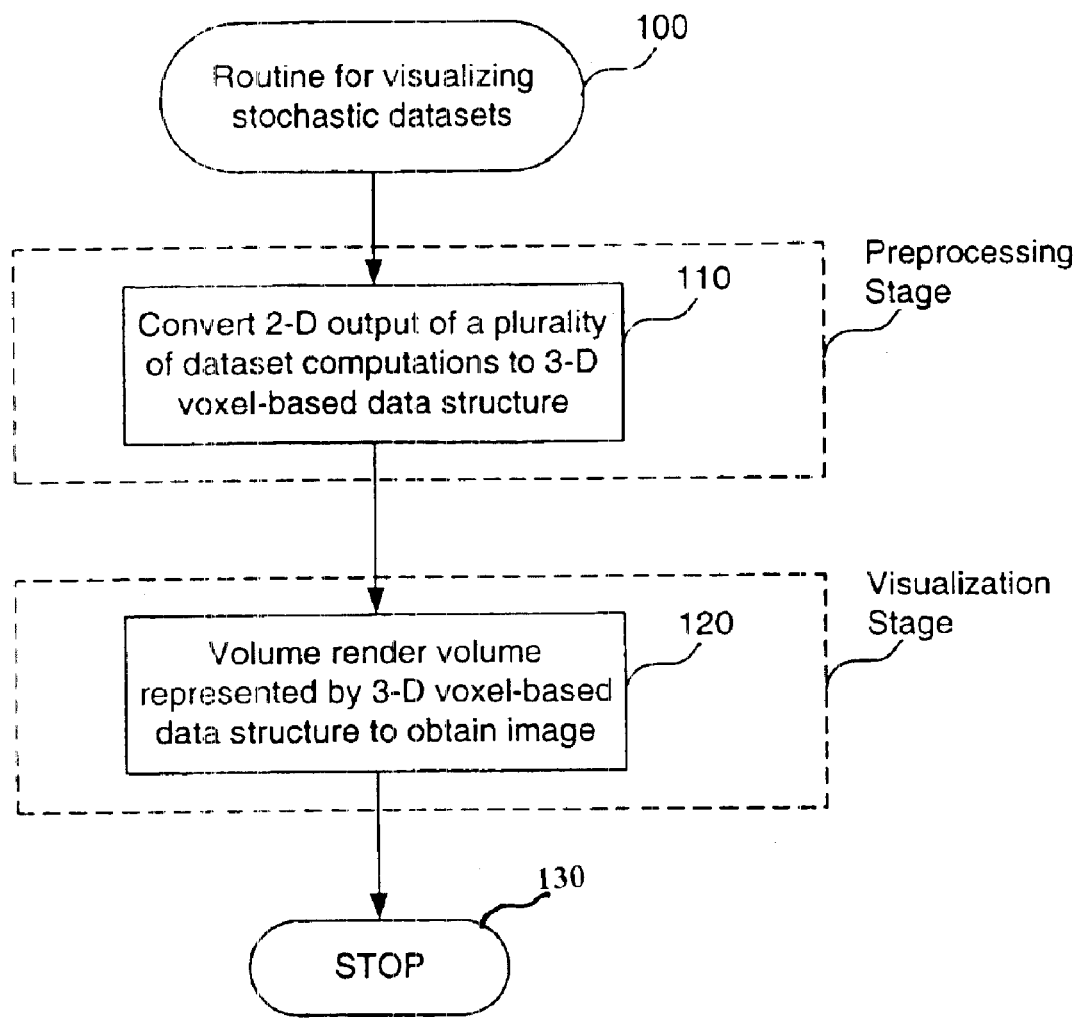
FIG. 1 is a flowchart representing the general operational flow of the steps involved in the routine for visualizing a plurality of stochastic datasets.

FIG. 1 depicts the two stages of the algorithm to visualize a plurality of stochastic data sets. Before the activity in FIG. 1 occurs, a plurality of data computations are initially generated wherein each data computation results in a surface set comprising a plurality of two-dimensional surfaces. For instance, in the art of simulating the effects of automobile collisions, many computations can be made wherein the computations are based on a parameter value (or group of parameter values) for an automobile. This results in a very large number of scenarios for the same automobile impacting the same obstacle, with variation in a selected group of parameters, for example. Each variation in the value of one of the parameters results in yet another scenario.

Thus, after generating two-dimensional surface sets for each of a plurality of data computations (that is, generating two-dimensional output for each of the above-referenced scenarios), in step 110, the preprocessing stage, the multiple two-dimensional outputs are converted to one three-dimensional, voxel-based form representation. This voxel-based representation is then saved as an image file (step not shown).

Control continues with step 120, the visualization stage. In step 120, the volume in the image file is rendered using an Application Program Interface (API) to obtain color and transparency features. One example of an API is the OpenGL Volumizer™ program, manufactured by Silicon Graphics, Inc., of Mountain View, Calif.

Finally, control ends with step 130.

Figure 2:
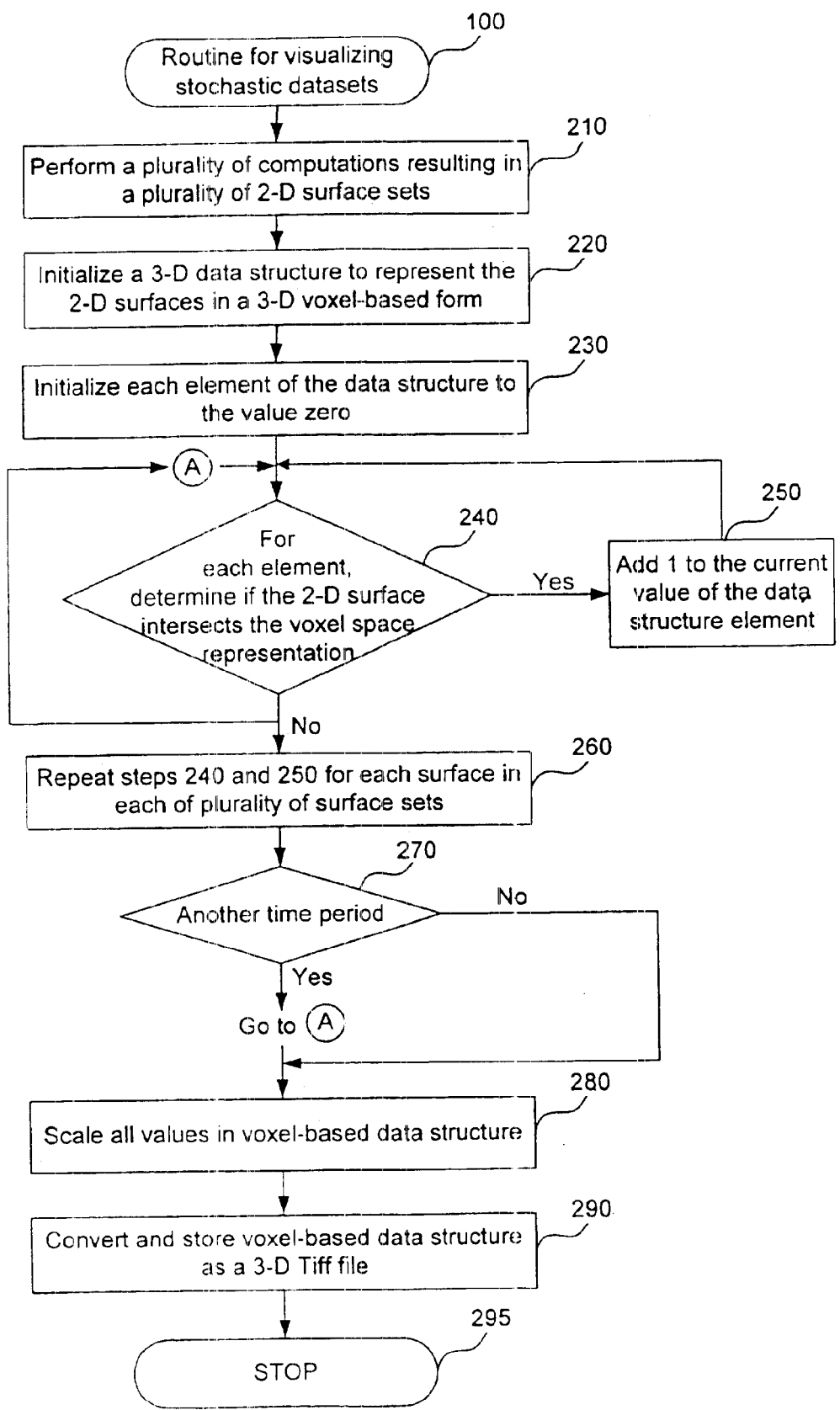
FIG. 2 is a flowchart representing the general operational flow of the steps involved in the preprocessing stage of the routine for visualizing the plurality of stochastic data sets.

FIG. 2 shows the routine for the preprocessing stage of the routine for visualizing stochastic datasets 100.

Control begins with step 210. In step 210, a plurality of dataset computations are performed, resulting in a plurality of two-dimensional surface sets wherein each surface set comprises a number of surfaces.

In step 220, a three-dimensional data structure is initialized to represent the two-dimensional surfaces in a three-dimensional voxel-based format. In one embodiment, the data structure is an array wherein each element of the array represents the subspace of one voxel in the three-dimensional voxel-based format. In other embodiments, any other viable data structures (e.g. trees) can be used to represent the subspace of one voxel.

In step 230, each element i, j, k of the data structure (the voxel based data structure) is initialized to the value zero to prepare for processing.

In step 240, for each element i, j, k of the three-dimensional data structure (that is, for each voxelspace), a determination is made of whether a surface contained in one of the plurality of surface sets in two-dimensional form intersects the particular voxel space represented by an element i, j, k of the three dimensional data structure. If it is determined that the surface intersects the voxel space, the current value in the array element i, j, k is incremented by one. For example, after initialization, the current value in the array element i, j, k is zero.

If it is determined that the particular surface intersects the particular voxel space, in step 250, the value zero in the data structure element i, j, k is incremented by one, and control resumes with step 260. If it is determined that the particular surface does not intersect the particular voxel space, the current value in data structure element i, j, k remains the same and control resumes with step 260.

In step 260, steps 240 and 250 are repeated. In other words, in step 260, the determination is made for the next surface in the surface set Continuing with the above example in which the initial value of zero was incremented by one, if it is determined that this surface (that is, the next surface in the surface set) intersects the voxel space represented by the data structure element i, j, k, the current value of one in the data structure element is incremented by one, thus resulting in a stored value of two in the data structure element i, j, k.

Similarly, in step 270, a determination is made of whether the computer model involves simulation over a period of time. If this is true, control resumes with label A, and the above-referenced determination of intersection and incrementation occurs for the next time period. After all time periods are accounted, control then resumes with step 280. If this is not true (that is, there is not a series of computations occurring over a period of time), control resumes with step 280.

In step 280, all values in the voxel-based data structure are scaled to one byte components according to the number of datasets to form a probability density. In another embodiment, however, the values in the voxel-based data structure are scaled to one word components. In other embodiments, the values can be scaled to components of any other viable size.

In step 290, the voxel-based data structure is converted and stored as a three dimensional image file. In one embodiment, the image file can be a TIFF file. In another embodiment, however, the image file can be a GIFF file. In further embodiments, the image file can be of any other viable format.

Finally, control ends with step 295.

Figure 3:
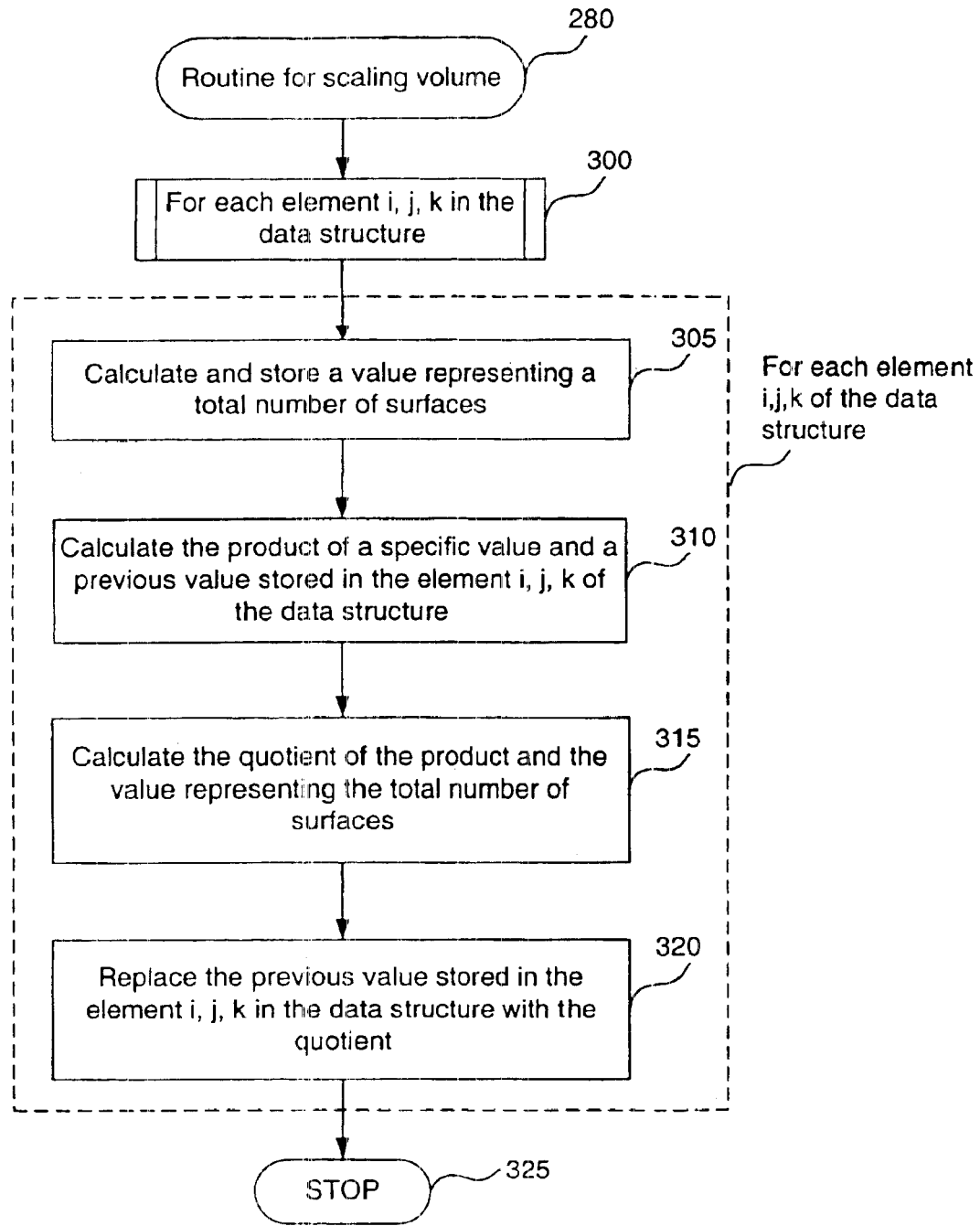
FIG. 3 is a flowchart representing the general operational flow of the steps involved in scaling the values of the data structure.

FIG. 3 depicts a routine 280 for scaling all values in the data structure to a specified component size (e.g. one byte or one word) according to the number of datasets to form a probability density.

Steps 305–320 are repeated for each element i, j, k of the data structure. Control begins with step 305. In step 305, a value representing the total number of surfaces is calculated and stored in a variable, for example. For instance, if a total of five data sets were used in the computations that resulted in two-dimensional surfaces and each of the five data sets contained ten surfaces, then the value representing the total number of surfaces would be fifty.

In step 310, the product of the specified value and the value stored in the data structure i, j, k is calculated. In one embodiment, the specified value represents the value of the component size to which the values in the data structure are scaled.

For example, if each data structure element i, j, k is to be scaled to a one byte component, the specified value would be 255, representing an 8-bit (or one byte) value.

In step 315, the quotient of the above-referenced product and the total number of surfaces for a given time period is then calculated to obtain a probability density. Both of the operations in step 310 and 315 occur for each element i, j, k of the data structure. In other words, for each element of the data structure, the element is replaced according to the following equation:

datastructure[$i, j, k$]=specified value*datastructure[$i, j, k$]/num, wherein datastructure[i, j, k] is a particular element of the data structure, specified value is the value of the component size to which the element value is scaled, and num is the total number of data sets taken from the two dimensional computational output In step 320, the previous value stored in the data structure element i, j, k is replaced with the above-referenced quotient value.

Finally, control ends with step 325.

Visualization Stage—Stage Two

Figure 4:
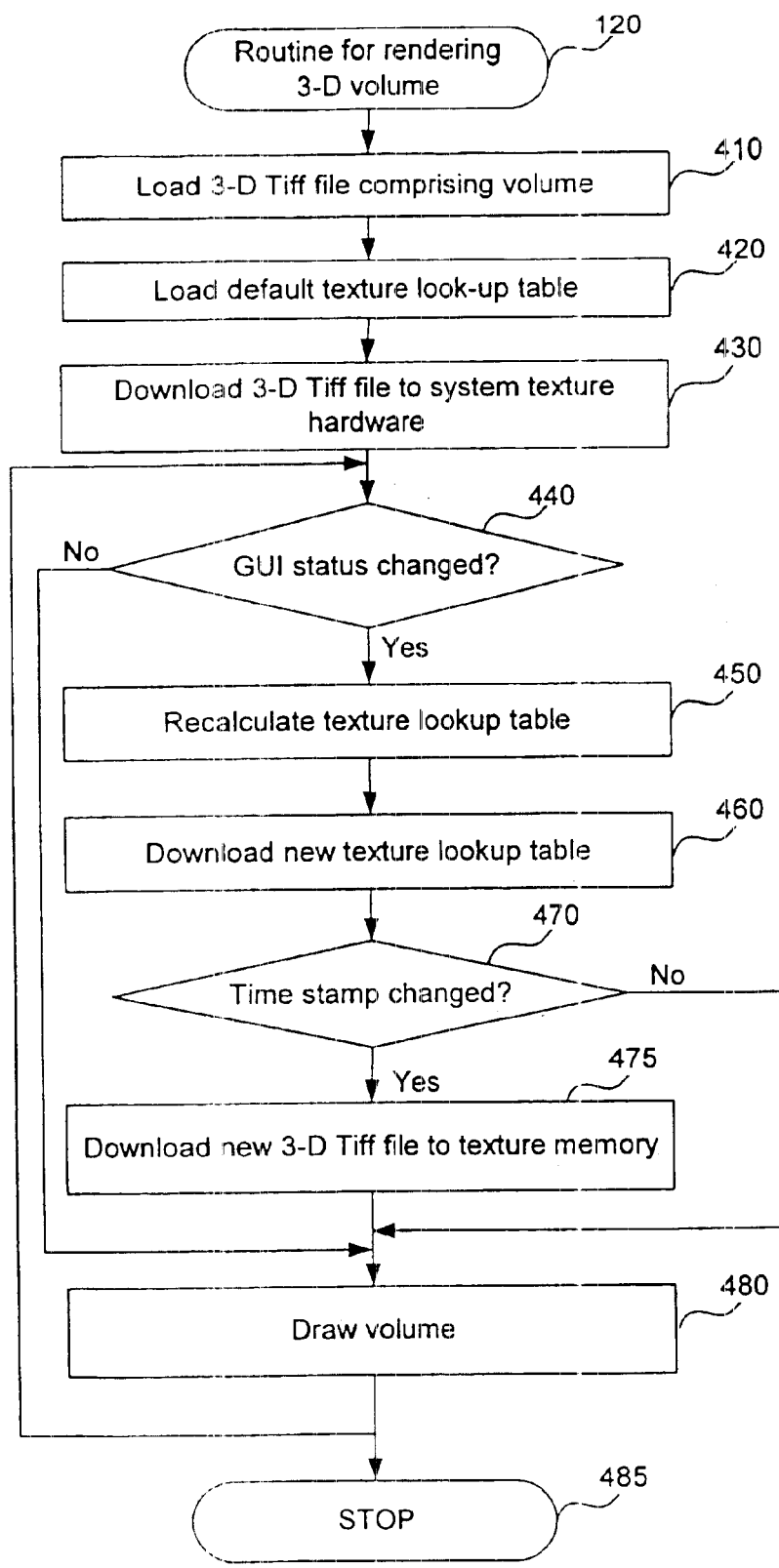
FIG. 4 is a flowchart representing the general operational flow of the steps involved in the visualization stage of the routine for visualizing the plurality of stochastic data sets.

FIG. 4 depicts a routine for rendering a three-dimensional voxel-based representation 120.

In step 410, an image file comprising the three-dimensional volume is loaded into a system memory.

In step 420, a default texture look-up table is loaded into the system memory. In one embodiment, the default texture look-up table comprises values for the colors red, green, blue, and an alpha value (i.e., the transparency value). In another embodiment, however, two texture look-up tables are employed. In this embodiment, a first texture lookup table comprises the color values red, green, and blue. A second texture look-up table comprises the transparency value. Having dual texture look-up tables allows independent manipulation of the transparency and color display.

The data in the three-dimensional volume is passed through the look-up table(s) each time it gets rendered. In other words, each individual value in the three-dimensional data structure is mapped to a color and transparency value pair in realtime. For example, a value ranging from 0 to 255 could be stored in each element of the three-dimensional data structure. When rendering occurs, this value is used as an index into the color/transparency look-up table(s) to obtain the corresponding rendering values for the colors and transparency. The main volume rendering program, can allow the user via its Graphical User Interface, to modify the color/transparency table(s) by choosing different profiles of the data display.

For instance, if the user is only interested in displaying voxels with an indexing value greater than 200, indexing values less than 200 would be set to a transparency value of 0, indicating that the 0 valued entries represent a very transparent voxel-space that would not be displayed to the user. Transparency look-up table entries indexed by voxel values greater than 200 would be scaled in a linear fashion from values greater than 0 to the value 255, thus gradually allowing the high value data to be more visible. As an example, assuming that the user is interested in displaying voxels with values greater than 200, the transparency look-up table entries indexed by the value 201 could contain a transparency value of 5. The transparency look-up table entry indexed by the value 202 could contain a transparency value of 10. The transparency look-up entry indexed by the value 203 could contain a transparency value of 15, and so forth up to the maximum value of 255. See Table 1. The same process could be used to display the color values as well.

TABLE 1

| | Texture Lookup Table | | | |
|---|---|---|---|---|
| indices | R | G | B | A (Transparency) |
| 255 | | | | |
| \| | | | | |
| 202 | | | | 10 |
| \| | | | | |
| 201 | | | | 5 |
| \| | | | | |
| 200 | | | | |
| \| | | | | |
| 199 | | | | 0 |
| \| | | | | 0 |
| \| | | | | 0 |

TABLE 1-continued

Texture Lookup Table

| indices | R | G | B | A (Transparency) |
|---------|---|---|---|------------------|
| |  |   |   |   | 0 |
| |  |   |   |   | 0 |
| |  |   |   |   | 0 |
| |  |   |   |   | 0 |
| 0       |   |   |   | 0 |

In step 430, the image file initially loaded into system memory in step 410 is downloaded to texture memory to prepare the volume for volume rendering.

In step 440, Graphical User Interface (GUI) input is monitored, and a determination of whether the user wishes to alter the graphical display is made. If the user does not wish to alter the graphical display, control resumes with step 480. If the user wishes to alter the graphical display, control resumes with step 450.

In step 450, the volume rendering applications programming interface (API) recalculates a new texture lookup table to obtain the new transparency and color values for the associated indices.

In step 460, the new texture lookup table is downloaded to the texture memory in preparation for drawing the volume.

In step 470, a determination is made of whether there is data representing another time period. If there is no data representing another time period, control ends with step 485. If there is data representing another time period, control resumes in step 475.

In step 475, the new image file associated with this time period is downloaded to the texture memory.

In step 480, the volume is drawn. Control then resumes with step 440, and the process described above is repeated for all additional time periods.

Finally, control ends with step 485.

Figure 5:
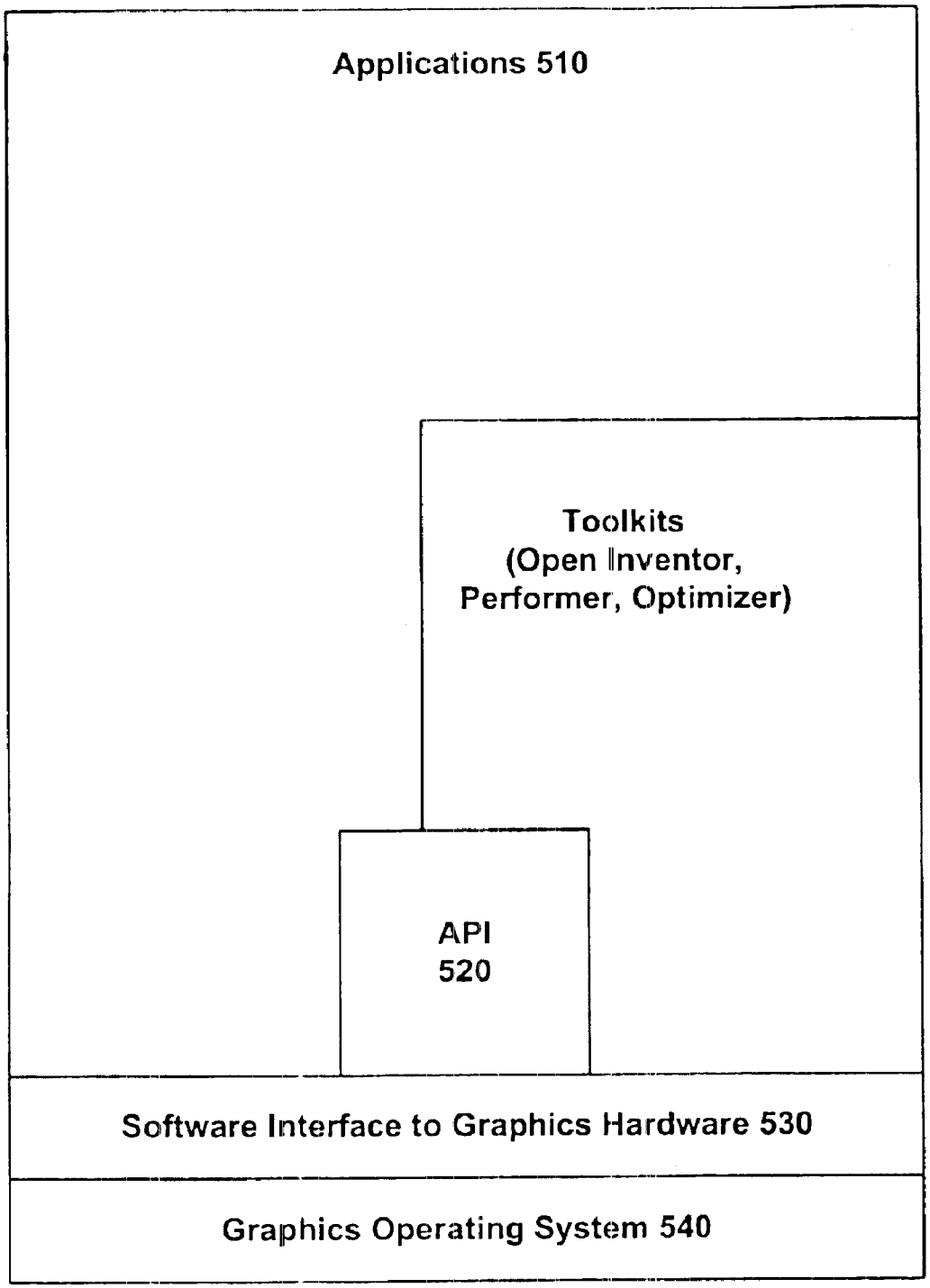
FIG. 5 is a graphical representation of the interconnection of the various components involved in a typical graphical system.

FIG. 5 illustrates the various components of a graphical system that can carry out volumetric-based visualization of multiple datasets according to the present invention. In one embodiment, the functionality of preprocessing stage 10 and visualization stage 120 as described above with respect to FIGS. 1–4 are carried out in the graphical system of FIG. 5. Applications layer 510 is the layer at which the main application program resides. Applications layer 510 typically contains a graphical user interface (GUI) to allow the user to interact and control operation of the graphics system. Application programming interface (API) 520 resides between the applications layer 510 and software interface to graphics hardware 530. Application programming interface 520 is the means by which the main application program 510 accesses the operating system 540. For example, OpenGL Volumizer® is an API developed by Silicon Graphics, Inc., of Mountain View, Calif.

Software interface to graphics hardware 530 resides between API 520 and operating system 540. Software interface to graphics hardware 530 can be any software interface to graphics hardware which supports rendering and imaging operations. For example, OpenGL® is a well known software interface to graphics hardware developed by Silicon Graphics, Inc.

Operating system 540 is the main operating system and it interacts with graphics hardware (not shown). In one example, operating system 540 is an IRIX operating system running on an ONYX machine available from Silicon Graphics, Inc. of Mountain View, Calif.

Figure 6:
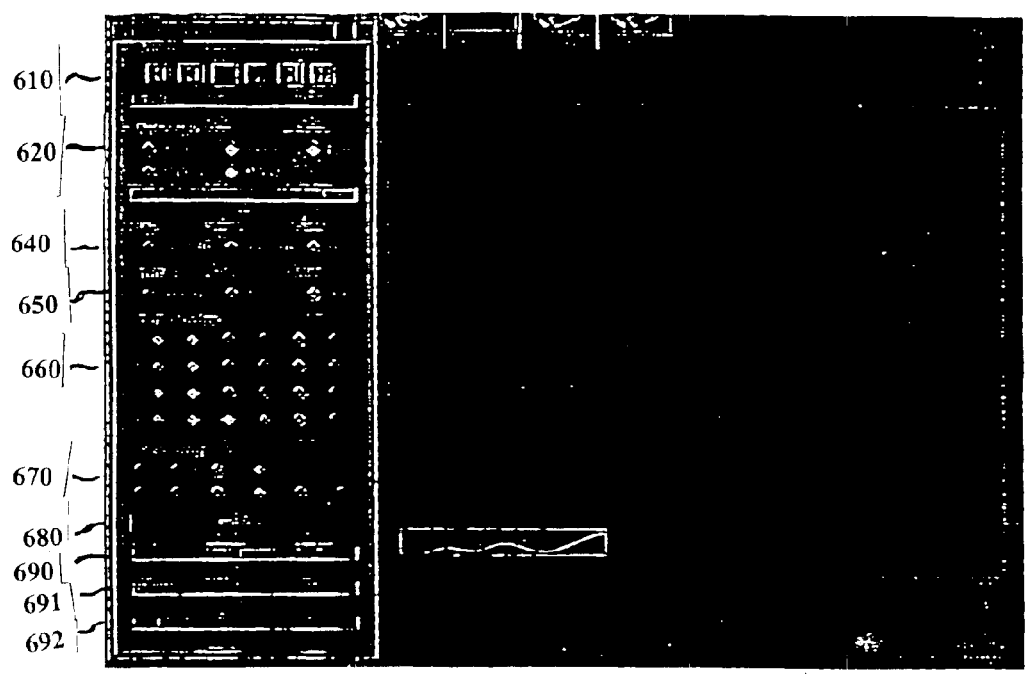
FIG. 6 is a graphical user interface (GUI) window that allows the user to control how an image will be rendered.

FIG. 6 is a GUI window that allows the user to control how a viewed image is displayed. Animation control 610 allows the user to animate the image. Render quality control 620 allows the user to control the quality of rendering of the image. It contains rendering controls such as depth, perspective, filtering, stereo, and overlay. Msc control 640 allows the user to save the current texture look-up table calculations, obtain statistics on frames, and exit the program Texture lookup table type control 650 allows the user to define the type of texture lookup table to be of type intensity, IA, or color. Texture lookup table subfunctions control 660 allows the user to specify the subfunctions for the texture lookup table (TLUT). Edit subfunction control 670 allows the user to edit the subfunctions. Gaussian control 680 allows the user to specify the shape of the image. Centering control 690 allows is a slider to allow the user to control centering of the image. Width control 691 is a slider to allow the user to control the width of the image. Height control 692 is a slider to allow the user to control the height of the image.

CONCLUSION

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above-described exemplary embodiments, but should be defined only in accordance with the following claims and their equivalents.

What is claimed is:

1. A method of visualizing output from a plurality of dataset computations, wherein the output comprises a plurality of two-dimensional surface sets, each of the surface sets comprising a plurality of surfaces, wherein the method comprises the steps of:

(a) initializing a three-dimensional data structure to represent the plurality of two-dimensional surface sets in a three-dimensional voxel-based format;

(b) computing the number of said surfaces in each of said surface sets that intersects with each voxel in said voxel-based format, said number representing a total number of intersecting surfaces for a particular voxel;

(c) assigning said number to its corresponding said voxel;

(d) scaling said number to a specified component size, and (e) saving said data structure as an image file.

2. The method of claim 1, further comprising the step of:

(f) repeating steps (a)–(e) a plurality of times if a problem analyzed by the dataset computations is dynamic to generate a series of three-dimensional voxel-based representations spanning a time sequence.

3. The method of claim 2, wherein step (d) comprises, for each data structure element i, j, k representing a particular voxel, the steps of:

(i) calculating and storing a number representing a total number of said surfaces;

(ii) calculating the product of a specified value representative of said specified component size and said number representing a total number of intersecting surfaces for the particular voxel;

(iii) calculating the quotient of said product and said number representing said total number of said surfaces; and (iv) replacing said number representing a total number of intersecting surfaces for the particular voxel with said quotient, said quotient representing a scaled value for said total number of intersecting surfaces for the particular voxel.

4. The method of claim 3, wherein step (i) comprises the step of:

(a) calculating and storing a value representing a total number of surfaces spanning a number of time periods.

5. The method of claim 2, wherein said image file is a Tiff file.

6. The method of claim 2, further comprising the step of:

(g) rendering said image file.

7. The method of claim 6, further comprising the step of:

(h) drawing a volume, said volume represented by said three-dimensional data-structure.

8. The method of claim 6, wherein step (g) is accomplished by employing a volume rendering application program interface (API).

9. The method of claim 8, wherein step (g) comprises the steps of:

(1) generating a texture look-up table; and (2) calculating and storing values in said texture look-up table, wherein each of said values in said texture look-up table is indexed by a value representative of a scalar value for each voxel in said three dimensional data structure.

10. The method of claim 9, wherein step (1) comprises the step of:

(1) generating a texture look-up table comprising values representative of the colors red, green, and blue, and a transparency value.

11. The method of claim 9, wherein step (1) comprises the step of:

(i) generating a first and a second texture look-up table.

12. A system for visualizing output from a plurality of dataset computations, comprising:

a plurality of two-dimensional surface sets, each surface set comprising a plurality of surfaces;

a three-dimensional voxel-based data structure, said data structure representing said plurality of two-dimensional surface sets in a three dimensional format, and a texture lookup table containing values that are indexed by a value representative of a scalar value for each voxel in said three-dimensional voxel-based data structure.

13. The system of claim 12, wherein each voxel of said three-dimensional voxel-based data structure comprises:

a value representing a number of said two-dimensional surfaces that intersect said voxel.

14. The system of claim 12, further comprising:

an application programming interface (API), said API employing said texture lookup table to render a volume represented by said three-dimensional voxel-based data structure; and a main application program, said main application program containing a graphical user interface (GUI) wherein a user can alter transparency and color values of said volume.

15. The system of claim 12, wherein said three-dimensional voxel-based data structure is an array.

16. The system of claim 12, further comprising:

an image file comprising a volume represented by said three-dimensional voxel-based data structure.

* * * * *